(12) United States Patent
Nash

(10) Patent No.: US 8,407,948 B1
(45) Date of Patent: Apr. 2, 2013

(54) LANDSCAPE EDGING DEVICE

(76) Inventor: Gordon J. Nash, Charlestown, NH (US)

( * ) Notice: Subject to any disclaimer, the term of this patent is extended or adjusted under 35 U.S.C. 154(b) by 0 days.

(21) Appl. No.: 13/213,605

(22) Filed: Aug. 19, 2011

(51) Int. Cl.
E02D 27/00 (2006.01)

(52) U.S. Cl. ......................................................... 52/102

(58) Field of Classification Search ............... 52/102, 52/38, 169.1, 311.1, 596, 600, 603–605, 52/608; 47/33
See application file for complete search history.

(56) References Cited

U.S. PATENT DOCUMENTS

| 2,888,779 | A | * | 6/1959 | Hostetter | 47/33 |
| 4,934,093 | A | * | 6/1990 | Yanna | 47/33 |
| 5,080,523 | A | | 1/1992 | Steiner | |
| 5,119,587 | A | | 6/1992 | Waltz | |
| 5,259,154 | A | | 11/1993 | Lilley | |
| D385,635 | S | | 10/1997 | Nebelsieck | |
| 5,901,526 | A | | 5/1999 | Vidmar et al. | |
| 5,921,021 | A | | 7/1999 | Coates | |
| 6,226,934 | B1 | * | 5/2001 | Gaston | 52/102 |
| 6,327,815 | B1 | | 12/2001 | Becton et al. | |
| 6,418,675 | B1 | | 7/2002 | Peggs et al. | |
| 6,938,369 | B2 | | 9/2005 | Zwier | |
| 2005/0050823 | A1 | * | 3/2005 | Whitson | 52/311.1 |

* cited by examiner

Primary Examiner — Mark Wendell
Assistant Examiner — Keith Minter

(57) ABSTRACT

A landscape edging device provides alignable blocks that are both conformable to a desired curvature and provide a broad base for weed control and ease of mowing along landscaping edges. The device includes a planar base having a concave end and a convex end. The device also has a planar divider coupled to and extending upwardly from a top surface of said base. The divider has a concave end and a convex end that are offset from the ends of the base.

20 Claims, 6 Drawing Sheets

LANDSCAPE EDGING DEVICE

BACKGROUND OF THE DISCLOSURE

Field of the Disclosure

The disclosure relates to landscaping devices and more particularly pertains to a new landscaping device for providing alignable blocks that are both conformable to a desired curvature and provide a broad base for weed control and ease of mowing along landscaping edges.

SUMMARY OF THE DISCLOSURE

An embodiment of the disclosure meets the needs presented above by generally comprising a planar base having a concave end and a convex end. The device also has a planar divider coupled to and extending upwardly from a top surface of said base. The divider has a concave end and a convex end that are offset from the ends of the base.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
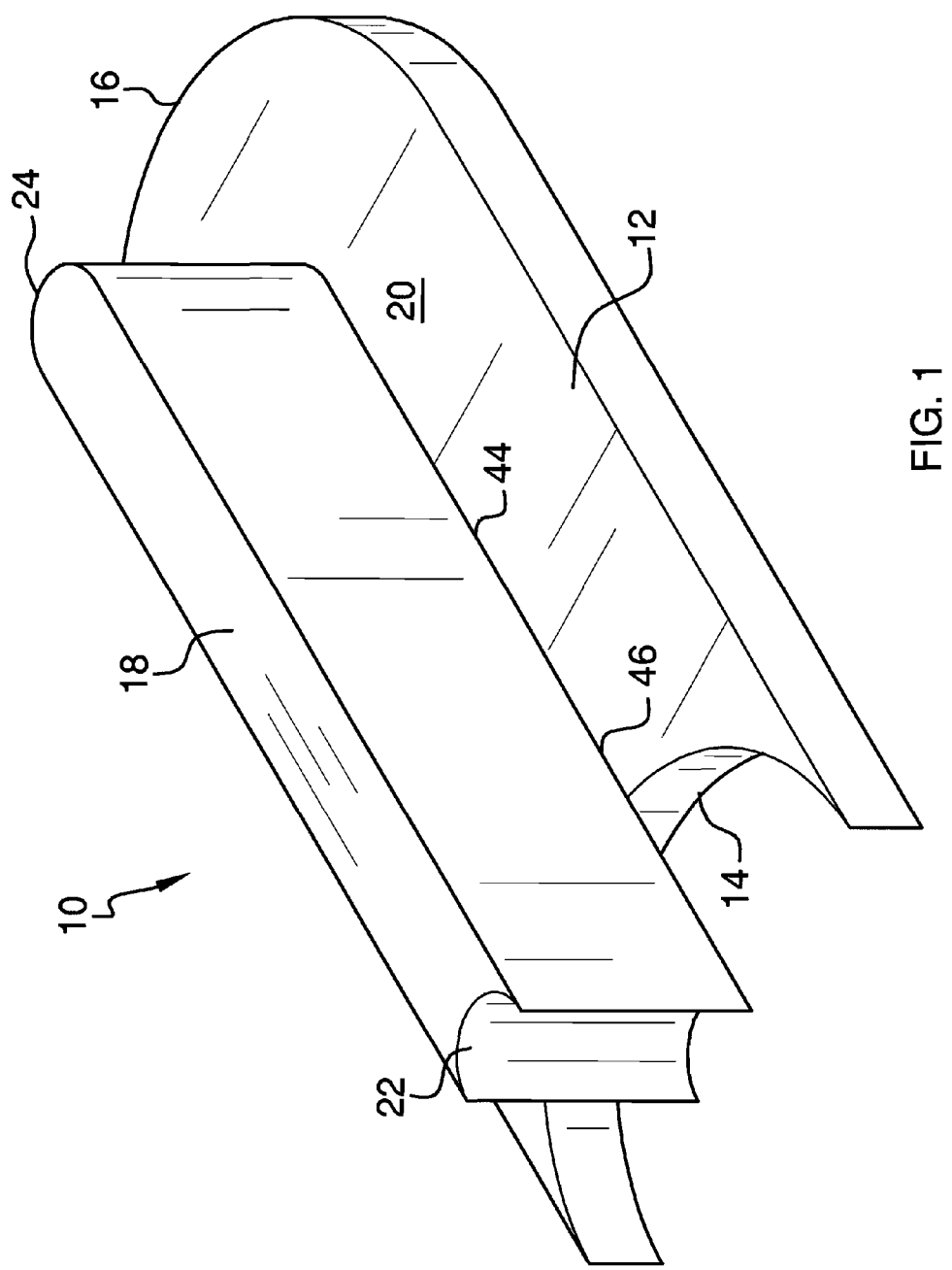
FIG. 1 is a top rear side perspective view of a landscape edging device according to an embodiment of the disclosure.
Figure 2:
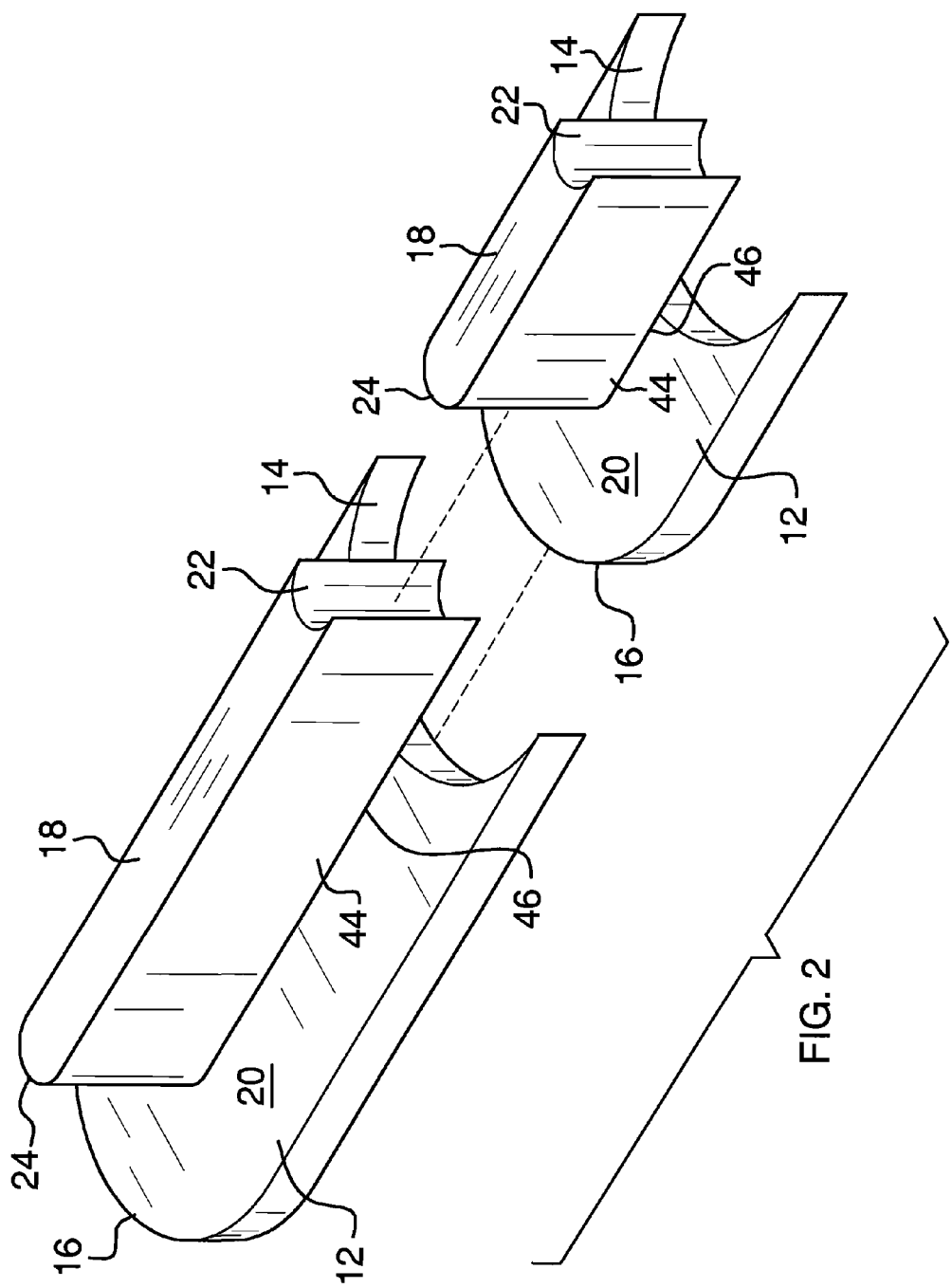
FIG. 2 is an exploded top rear side perspective view of an embodiment of the disclosure.
Figure 3:
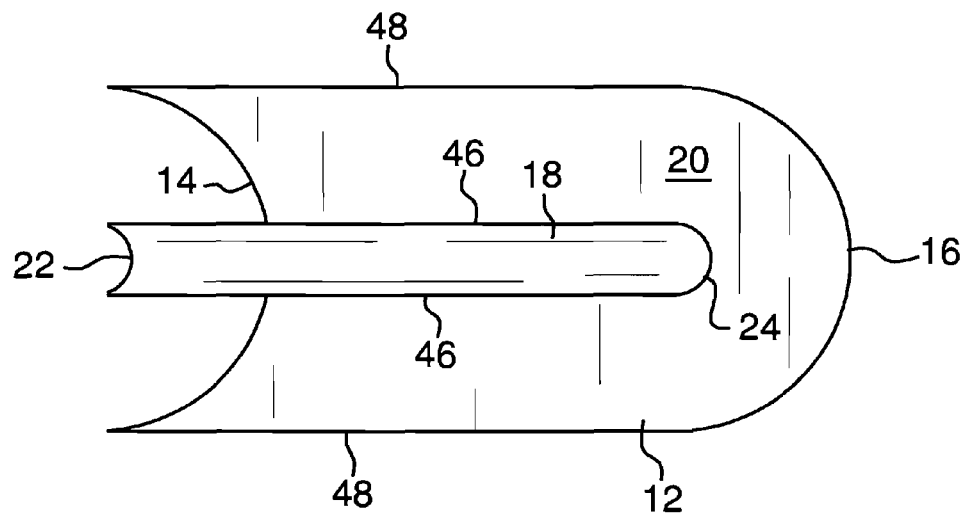
FIG. 3 is a top view of an embodiment of the disclosure.
Figure 4:
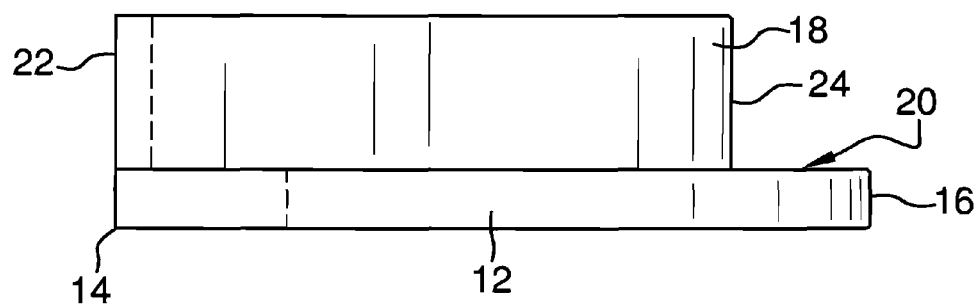
FIG. 4 is a side view of an embodiment of the disclosure.
Figure 5:
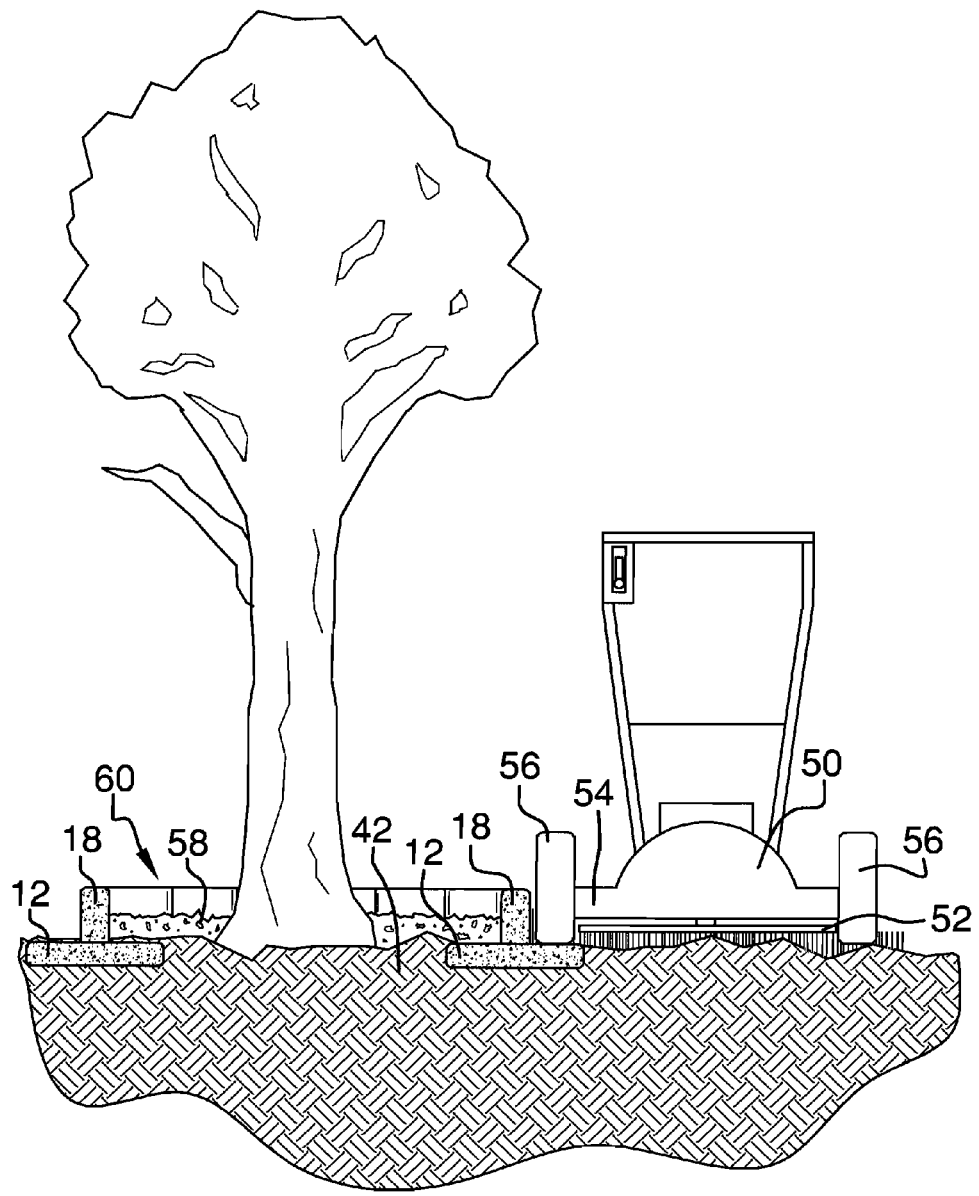
FIG. 5 is a front view of an embodiment of the disclosure in use.
Figure 6:
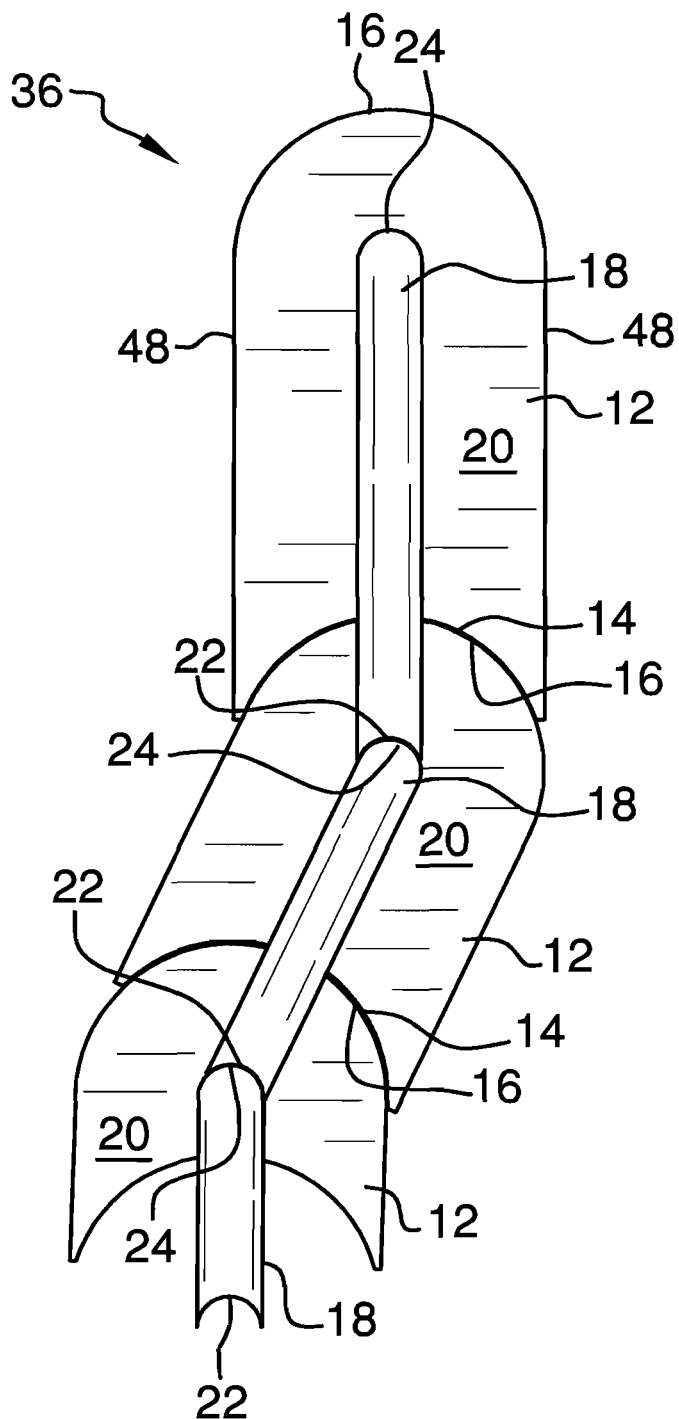
FIG. 6 is a top view of an embodiment of the disclosure.
Figure 7:
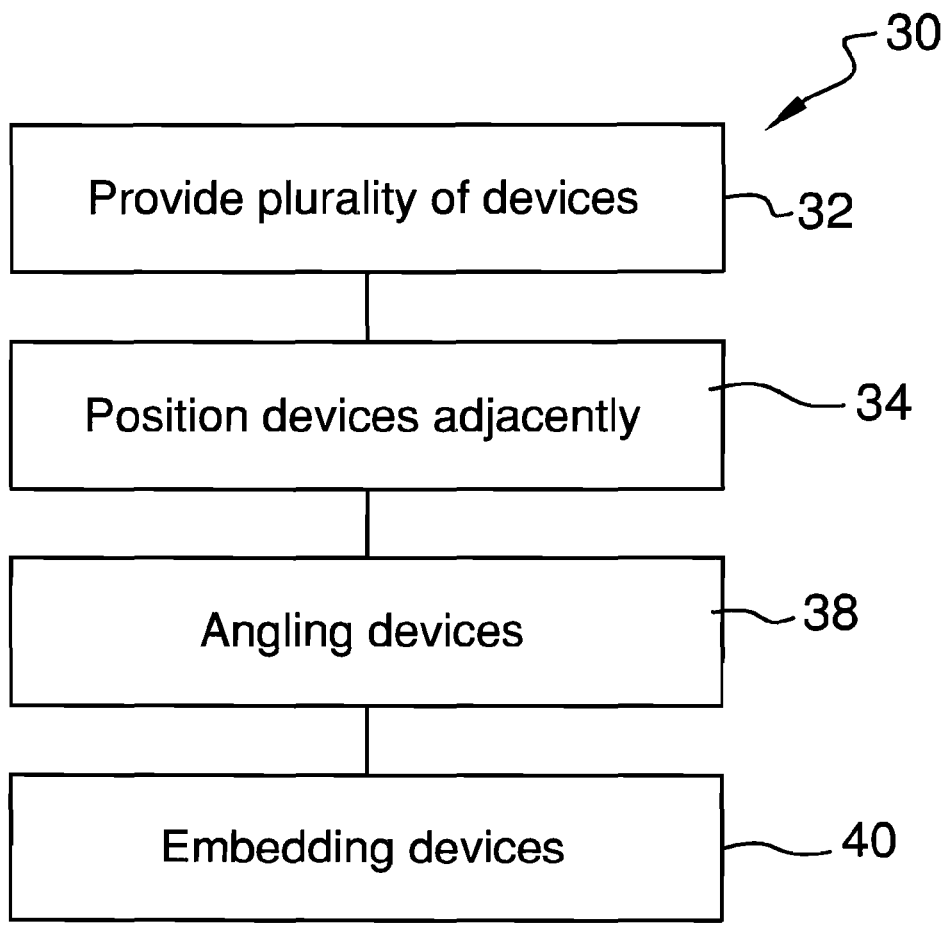
FIG. 7 is a schematic view of a method according to an embodiment of the disclosure.

With reference now to the drawings, and in particular to FIGS. 1 through 7 thereof, a new landscaping device embodying the principles and concepts of an embodiment of the disclosure and generally designated by the reference numeral 10 will be described.

As best illustrated in FIGS. 1 through 7, the landscape edging device 10 generally comprises a planar base 12 having a concave end 14 and a convex end 16. The concave end 14 of the base 12 is semi-circular and the convex end 16 of the base is also semi-circular. A planar divider 18 is coupled to and extends upwardly from a top surface 20 of the base 12. A longitudinal axis of the base 12 is coplanar with a longitudinal axis of the divider 18. A length of the base 12 is equal to a length of the divider 18. Similar to the structure of the base 12, the divider 18 has a concave end 22 and a convex end 24. The concave end 22 of the divider 18 is positioned offset from the concave end 16 of the base 12. The concave end 22 of the divider 18 is also offset from the concave end 14 of the base 12. To provide proper alignment during use, the offset between the divider 18 and the base 12 is by a distance equal to a width of the base 12.

A radius of the concave end 16 of the base 12 is equal to a radius of the convex end 14 of the base 12. Thus, the convex end 14 of the base 12 is matingly insertable into the concave end 16 of the base 12 of an adjacently positioned edging device 10. For proper alignment, the radius of the concave end 16 of the base 12 and the radius of the convex end 14 of the base 12 are each equal to half a width of the base 12.

A radius of the concave end 22 of the divider 18 is equal to a radius of the convex end 24 of the divider 18. Thus, the convex end 24 of the divider 18 is matingly insertable into the concave end 22 of the divider 18 of an adjacently positioned edging device 10. The radius of the concave end 22 of the divider 18 and the radius of the convex end 24 of the divider 18 are each equal to half a width of the divider 18.

In use, the device 10 permits a method 30 of landscaping curved edges. A first step 32 of the method 30 is to provide a plurality of the devices 10 as described above. Another step 34 is to position each landscape edging device 10 adjacent to another landscape edging device 10 forming a line 36 of the edging devices 10. A step 38 of angling each landscape edging device 10 relative to an adjacently positioned device 10 forms the curvature of the line 36 of edging devices 10 that conforms to a desired shape. Another step 40 is embedding the base 12 of each device 10 into a ground surface 42 such that the top surface 20 of the base 12 is substantially coplanar with the ground surface 42. Thus, the divider 18 of each device 10 extends upwardly from the ground surface 42. The aligned dividers 18 provide a well-defined border while the base 12 extends outwardly from opposite sides 46 of a base 44 of the divider 18 by a distance sufficient to prevent weeds from spreading under the base 12. The width of the base 12 is also sufficient to permit a lawnmower 50 to be passed over the base 12 such that the blade 52 of the lawnmower will cut grass extending up adjacent to an outermost edge 48 of the base 12 when a deck 54 or tire 56 of the lawnmower 50 is adjacent to the divider 18. Material 58 such as mulch or stone may be positioned within an area 60 defined and surrounded by the devices 10.

The base 12 may have a width between about 18 and 20 centimeters and a thickness between about 3 and 4 centimeters. The length of the base 12 may vary greatly to facilitate forming straight sections but is typically between about 20 and 40 centimeters. The divider 18 may have a height between about 20 and 25 centimeters, a thickness between about 3 and 4 centimeters, and a length equivalent to the length of the base 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A landscape edging device comprising:
   a planar base having a concave end and a convex end; and
   a planar divider coupled to and extending upwardly from a top surface of said base, said divider having a concave end and a convex end, said concave end of said divider being offset from said concave end of said base by a distance equal to a width of said base.

2. The device of claim 1, further including a longitudinal axis of said base being coplanar with a longitudinal axis of said divider.

3. The device of claim 1, further including said concave end of said base being semi-circular and said convex end of said base being semi-circular.

4. The device of claim 1, further including a radius of said concave end of said base being equal to a radius of said convex end of said base.

5. The device of claim 1, further including a radius of said concave end of said divider being equal to a radius of said convex end of said divider.

6. The device of claim 1, further comprising:
   said concave end of said base being semi-circular and said convex end of said base being semi-circular;
   a longitudinal axis of said base being coplanar with a longitudinal axis of said divider, a length of said base being equal to a length of said divider;
   a radius of said concave end of said base being equal to a radius of said convex end of said base whereby said convex end of said base is matingly insertable into said concave end of said base of an adjacently positioned said edging device, said radius of said concave end of said base and said radius of said convex end of said base each being equal to half a width of said base; and
   a radius of said concave end of said divider being equal to a radius of said convex end of said divider whereby said convex end of said divider is matingly insertable into said concave end of said divider of an adjacently positioned said edging device, said radius of said concave end of said divider and said radius of said convex end of said divider each being equal to half a width of said divider.

7. A landscape edging device comprising:
   a planar base having a concave end and a convex end; and
   a planar divider coupled to and extending upwardly from a top surface of said base, said divider having a concave end and a convex end; and
   a radius of said concave end of said divider and a radius of said convex end of said divider each being equal to half a width of said divider.

8. The device of claim 7, further including a radius of said concave end of said divider being equal to a radius of said convex end of said divider.

9. The device of claim 7, further comprising said concave end of said divider being positioned offset from said concave end of said base.

10. The device of claim 7, further including said concave end of said base being semi-circular and said convex end of said base being semi-circular.

11. The device of claim 7, further including a radius of said concave end of said base being equal to a radius of said convex end of said base.

12. The device of claim 7, further including a radius of said concave end of said divider being equal to a radius of said convex end of said divider.

13. A landscape edging device comprising:
    a planar base having a concave end and a convex end; and
    a planar divider coupled to and extending upwardly from a top surface of said base, said divider having a concave end and a convex end;
    a longitudinal axis of said base being coplanar with a longitudinal axis of said divider; and
    a length of said base being equal to a length of said divider.

14. The device of claim 13, further including said concave end of said base being semi-circular and said convex end of said base being semi-circular.

15. The device of claim 13, further including a radius of said concave end of said base being equal to a radius of said convex end of said base.

16. The device of claim 13, further including a radius of said concave end of said divider being equal to a radius of said convex end of said divider.

17. A landscape edging device comprising:
    a planar base having a concave end and a convex end; and
    a planar divider coupled to and extending upwardly from a top surface of said base, said divider having a concave end and a convex end;
    a radius of said concave end of said base being equal to a radius of said convex end of said base; and
    said radius of said concave end of said base and said radius of said convex end of said base each being equal to half a width of said base.

18. The device of claim 17, further comprising said concave end of said divider being positioned offset from said concave end of said base.

19. The device of claim 17, further including said concave end of said base being semi-circular and said convex end of said base being semi-circular.

20. A method of using a landscape edging device for landscaping curved edges, the steps of the method comprising:
    providing a plurality of landscape edging devices, each said landscape edging device having a planar base having a concave end and a convex end, said concave end of said base being semi-circular and said convex end of said base being semi-circular, a planar divider coupled to and extending upwardly from a top surface of said base, a longitudinal axis of said base being coplanar with a longitudinal axis of said divider, a length of said base being equal to a length of said divider, said divider having a concave end and a convex end, said concave end of said divider being positioned offset from said concave end of said base, said concave end of said divider being offset from said concave end of said base by a distance equal to a width of said base, a radius of said concave end of said base being equal to a radius of said convex end of said base whereby said convex end of said base is matingly insertable into said concave end of said base of an adjacently positioned said edging device, said radius of said concave end of said base and said radius of said convex end of said base each being equal to half a width of said base, and a radius of said concave end of said divider being equal to a radius of said convex end of said divider whereby said convex end of said divider is matingly insertable into said concave end of said divider of an adjacently positioned said edging device, said radius of said concave end of said divider and said radius of said convex end of said divider each being equal to half a width of said divider;
    positioning each said landscape edging device adjacent to another said landscape edging device forming a line of said edging devices; and angling each said landscape edging device relative to an adjacently positioned said device whereby said line of edging devices conforms to a desired shape; and embedding said base of each said device into a ground surface such that said top surface of said base is coplanar with said ground surface whereby said divider of each said block extends upwardly from said ground surface.

* * * * *